United States Patent [19]

Persson et al.

[11] 4,136,005

[45] Jan. 23, 1979

[54] ELECTROLYTIC CHLORINATOR

[75] Inventors: Leif Persson; Bonde Hansen, both of Malmö, Sweden; Erik Eklund, Marbella, Spain

[73] Assignee: AG Licento, Switzerland

[21] Appl. No.: 828,887

[22] Filed: Aug. 29, 1977

[30] Foreign Application Priority Data

Sep. 6, 1976 [SE] Sweden .............................. 7609801

[51] Int. Cl.² .............................................. C25B 9/00
[52] U.S. Cl. ............................................... 204/266
[58] Field of Search ....................................... 204/266

[56] References Cited
U.S. PATENT DOCUMENTS

| | | | |
|---|---|---|---|
| 3,223,242 | 12/1965 | Murray | 204/266 |
| 3,767,557 | 10/1973 | Lamm | 204/266 |

Primary Examiner—R. L. Andrews
Attorney, Agent, or Firm—Hill, Gross, Simpson, Van Santen, Steadman, Chiara & Simpson

[57] ABSTRACT

A chlorinator for electrolytically producing chlorine from brine comprises an electrolytic cell having a vertical cation permeable diaphragm separating the anode and cathode compartments, a source of brine feeding concentrated brine into the anode compartment at regular intervals, and a mixing device in which chlorine gas produced by the electrolytic cell is mixed with a stream of water to be chlorinated. The electrolytic cell is provided with means for intermittently transferring small amounts of the anolyte from the anode compartment to the cathode compartment and for preventing the catholyte from coming into the anode compartment.

10 Claims, 3 Drawing Figures

ELECTROLYTIC CHLORINATOR

BACKGROUND OF THE INVENTION

1. Field of the Invention

The invention relates to a device for chlorinating water, and more particularly to an electrolytic cell of the diaphragm type having feeding and withdrawl means, such as for domestic-size applications.

2. Prior Art

The disinfection of the water in small swimming pools is normally accomplished by adding chlorine chemicals, e.g. in the form of chlorine tablets or sodium or calcium hypochlorite, which release or form chlorine in the water. This method is advantageous in that it does not require handling of liquid or gaseous chlorine and in that it does not require complex and expensive apparatus; the dosage and the addition is normally accomplished entirely manually.

However, this method also has several disadvantages. For example, to maintain the chlorine content of the water at a suitable and fairly constant level, it is necessary to add the chemicals relatively frequently and in accurate amounts. Moreover, the commercially available chlorine chemicals are unstable and consequently cannot be stored for long periods without losing some of their chlorinating effect. The added chemicals also cause a gradual increase of the content of foreign substances in the water. In addition, the chlorinating chemicals often have an undesired influence on the pH of the water, and from time to time other chemicals (hydrochloric acid) have to be added to control the pH.

The above-mentioned disadvantages may be avoided if the chlorine is added as gaseous chlorine. Gaseous chlorine may be fed to the water from pressurized steel containers, but because of the hazards involved in the handling of gaseous chlorine, chlorination by means of pure chlorine stored in pressurized containers is feasible only in larger, e.g. municipal, pools or plants. For smaller, residential pools or other installations which are not constantly operated or supervised by skilled attendants such chlorination is not recommendable.

For smaller pools and water supplies one may use gaseous chlorine, provided the chlorine is produced on the spot, e.g. by the electrolysis of a chloride solution, and fed directly into the water. The quantities of gaseous chlorine produced in the chlorinator then are always sufficiently small for simple safety measures to be adequate to practically eliminate the danger of chlorine poisoning.

Electrolytic chlorinators intended for use in residential swimming pools or other smaller installations are known in many different forms; U.S. Pat. No. 3,767,557 shows an example. However, in spite of the advantages that electrolytic chlorinators offer, such chlorinators have not gained widespread adoption, and the initially described method comprising addition of chlorine tablets or sodium or calcium hypochlorite is still prevailing as far as residential swimming pools and other small installations are concerned.

SUMMARY OF THE INVENTION

A general object of this invention is to provide an electrolytic chlorinator which is particularly suited for residential swimming pools or other installations having a small chlorine demand and which accordingly is a practical alternative to chlorination by the addition of chlorine tablets or hypochlorite compounds.

A more specific object is to provide an electrolytic chlorinator capable of safe and unattended operation for extended periods (months) and requiring substantially no operator manipulation other than infrequent replenishment of a supply of the material to be electrolyzed (salt in solid form) and setting of the desired chlorine output. For example, incorrect manipulation or lack of attention may not cause substantial danger of larger amounts of gaseous chlorine escaping to the surrounding air from the chlorinator, and moreover salt precipitates or other solid deposits in the chlorinator may not easily cause malfunction of the chlorinator.

Another more specific object is to provide an electrolytic chlorinator capable of continuous or intermittent operation, in the latter case during, for example, one or more periods per day, each period lasting, for example, one or a few hours. In accordance with this object, the chlorinator must restart reliably and resume chlorine production with little delay after an idle period, and accordingly the catholyte must be prevented from coming into the anode compartment during the idle periods.

Still other objects are to provide an electrolytic chlorinator which is sufficiently inexpensive to warrant private use. Related objects are to provide an electrolytic chlorinator which operates at high electrolytic efficiency so that an adequate chlorine output may be attained with low electric power consumption and low current density in the electrolytic cell; which requires no complex means for the control thereof, for cooling of the electrolytic cell or for purification of the salt or brine, etc.; and which can be installed in a simple manner and at a substantially arbitrary location adjacent the pool or the installation with which it is to be used.

The invention will be fully understood from the following detailed description of an exemplary embodiment with reference to the accompanying drawings.

On the drawings:

FIG. 1A is an enlarged sectional view of a portion of FIG. 1;

As shown on the drawings:

Figure 1:
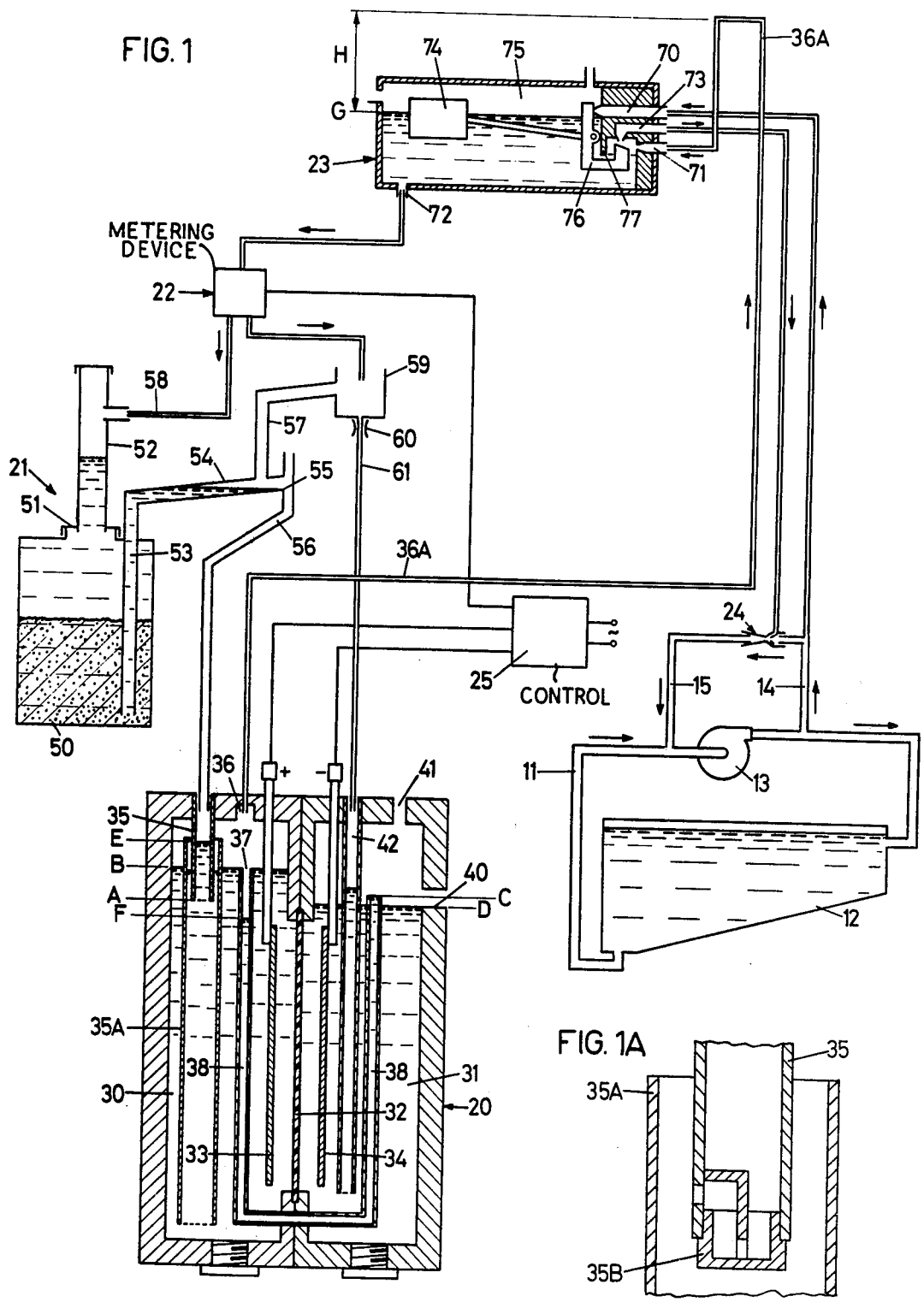
FIG. 1 is a diagrammatic illustration of a chlorinator made in accordance with the invention and used for the chlorination of the water in a swimming pool.

As shown in FIG. 1, the chlorinator illustrated by way of example is connected to a recirculating conduit 11 for a swimming pool 12 containing a body of water to be chlorinated. The recirculating conduit 11 has an intermittently operating recirculating pump 13, between the pressure and the suction sides of which the chlorinator is connected by way of an intake conduit 14 and a return conduit 15. The chlorinating and recirculating system of the pool 12 also comprises valves, filters and other ancillary devices which have been omitted for clarity. The chlorinator is adapted to feed pure chlorine to the pool water during operating periods of variable duration and frequency of repetition; the operating periods preferably coincide with the operating periods of the recirculating pump 13.

The main parts of the chlorinator are:

(a) An electrolytic cell 20 in which an anolyte in the form of concentrated brine (aqueous sodium chloride solution) is decomposed electrolytically so that gaseous chlorine, hydrogen gas and waste liquid containing sodium hydroxide are formed;

(b) A brine source 21 which contains a charge of solid sodium chloride and feeds concentrated brine to the electrolytic cell;

(c) A water metering device 22 which feeds controlled amounts of water to the electrolytic cell 20 and to the brine source 21 and which controls the brine feed to the electrolytic cell by controlling the water feed to the brine source;

(d) A float-controlled mixing valve 23 which feeds water to the metering device 22 and which receives the gaseous chlorine produced in the electrolytic cell and mixes it with a portion of a water stream diverted from and returned to the recirculating conduit 11;

(e) An eductor or jet pump 24 which is connected between the conduits 14 and 15 and combines the portion of the water stream chlorinated in the mixing valve 23 with the remainder of the stream diverted from the recirculating conduit;

(f) An electric current supply and control device 25 which during the operating periods feeds direct current of selected amperage to the electrodes of the electrolytic cell and which controls the metering device 22 and, moreover, has certain monitoring and safety functions.

Except for the current supply and control device 25, the above-mentioned main parts, which are described in greater detail hereinafter, are structurally combined into a unit, see FIG. 2, which may be mounted at a suitable location and connected to the recirculating conduit 11 and, by way of the device 25, to an existing electric power source.

During the operating periods of the chlorinator the electrolytic cell 20 continuously produces chlorine gas which is fed to the pool water through the mixing valve 23 and the eductor 24. The hydrogen gas evolved in the cell is discharged directly into the ambient air, and waste liquid containing sodium hydroxide is also discharged from the cell.

During the operating periods a predetermined quantity of water is intermittently fed from the metering device 22 to the brine source 21, and in response to each such feed, a corresponding quantity of saturated brine is displaced from the brine source to the anode compartment of the electrolytic cell; this compartment is designated 30 in FIG. 1. Each time the predetermined quantity of water is fed to the brine source 21, a quantity of water approximately three times as large is fed to a cathode compartment 31 of the electrolytic cell. This larger quantity of water acts both as a diluent for the catholyte in the cathode compartment and as a coolant. The water is fed by gravity from the mixing valve 23 which is mounted above the electrolytic cell, the brine source and the metering device and in which a constant water level is maintained.

For a purpose which is explained hereinafter, the metering device 22, each time an operating period commences, supplies to the brine source a single quantity of water which is substantially larger, e.g. ten times larger, than the quantity of water which is repetitively supplied throughout the operating periods.

The duration of the operating and idle periods of the chlorinator advantageously corresponds to the duration of the operating and idle periods of the recirculating pump 13, the supply of current to the electrolytic cell from the current supply and control device 25 advantageously being controlled by a timer controlling the operation of the recirculating pump 13. The amperage of the electrolyzing current is selected by means of a knob (not shown) on the device 25 in accordance with the chlorine demand, which in turn is dependent on the desired chlorine content in the pool water, the volume of the body of water in the pool, the air and water temperatures, the number of persons using the pool etc.

The rate of flow of the water which is fed, directly and by way of the brine source 21, to the electrolytic cell 20 by the metering device 22, is varied in dependence of the amperage of the electrolyzing current by the current supply and control device 25, but generally it is very small in comparison with the rate of flow in the recirculating conduit 11, e.g. 100 to 300 cubic centimeters per hour at electrolyzing current amperage on the order of 5 amperes. The rate of flow through the mixing valve is substantially larger, e.g. 10 to 100 liters per hour, but still small in comparison with the rate of flow in the recirculating conduit 11.

The electrolytic cell 20 is of the vertical membrane type. Accordingly, its anode compartment 30 and cathode compartment 31 are disposed side by side and separated by a substantially vertical membrane 32 forming a gas and liquid impermeable barrier between the anode and cathode compartments. The membrane in this case is a cation permeable membrane 32 (sold by E. I. du Pont de Nemours & Co. under the trademark "Nafion") permitting positive ions to migrate through it but forming a very efficient barrier to negative ions and sodium hydroxide. The sodium ions in the brine therefore can relatively easily migrate through the membrane 32 from the anode compartment 30 into the cathode compartment 31 and combine therein with hydroxyl ions into sodium hydroxide, NaOH. The hydroxyl ions and the sodium hydroxide in the catholyte, on the other hand, are effectively retained in the cathode compartment, particularly if the concentration of the hydroxyl ions is low.

The capability of the membrane to keep off the hydroxyl ions and the sodium hydroxide from the cathode compartment has very significant influence on the ability of the cell to resume chlorine production after an idle period, and also on the life of the anode. This is so, because if hydroxyl ions are present in the anolyte when an operating period commences, sodium hypochlorite, instead of pure chlorine, will be produced and this will go on until the anolyte is again free of hydroxyl ions.

The membrane 32 is substantially circular and flat, as are the anode 33 and the cathode 34. The diameter of the membrane is only slightly larger than that of the anode and the cathode, and all three parts are substantially coaxial.

The anode compartment 30 forms an essentially closed space in which a vertical brine inlet tube 35 extends downwardly to a level A below the anolyte level but above the level of the uppermost portions of the electrodes and the membrane. The upper end of the tube 35 is always in open communication with the atmosphere and thus is always at atmospheric pressure. The inlet tube 35 is surrounded in spaced relation by a vertical tube 35A extending from the uppermost portion of the anode compartment down to near the bottom of the anode compartment. At the top of the anode compartment there is a chlorine gas outlet 36 which is connected to the mixing valve 23 by way of a chlorine gas conduit 36A. At a level B higher than the abovementioned level A and lower than the chlorine gas outlet 36 there is an overflow 37 forming an inlet to a transfer passage 38, also referred to herein as a liquid trap passage or a liquid seal passage. This transfer passage 38 extends downwardly past the lowermost portion of the membrane 32 and opens into the cathode compartment 31 at a level C which is below the level B but higher than the level of the uppermost portion of the membrane, thus forming a liquid trap.

In operation of the chlorinator the anolyte level coincides with the overflow level B, and when fresh brine is fed into the anode compartment, a corresponding volume of the anolyte is forced into the cathode compartment 31 through the transfer passage 38. The liquid in this passage forms a liquid seal which prevents gas from passing between the anode and cathode compartments.

The cathode compartment 31 has an overflow 40 at a level D slightly below the level C where the transfer passage 38 opens, but above the level of the uppermost portion of the membrane 32. This overflow 40 forms a catholyte outlet, and the catholyte thus can never rise above the level D and, accordingly, cannot flow into the transfer passage 38 and thence into the anode compartment. At the top of the cathode compartment 31 there is a hydrogen gas outlet 41 opening directly to the atmosphere, and the space above the catholyte accordingly is always at atmospheric pressure. A water feed conduit 42 connected to the metering device 22 opens into the cathode compartment adjacent its bottom.

Apart from the above-mentioned inlets and outlets, the anode and cathode compartments 30 and 31 are sealed in gas- and liquid-tight manner.

The foregoing, the electrolytically active parts of the electrolytic cell, that is, primarily the electrodes 33, 34 and the interposed membrane 32, are completely and constantly below both the anolyte level B and the catholyte level D.

When the electrolytic cell 20 is operating as intended, fresh brine from the brine source 21 is intermittently fed into it through the inlet tube 35 in such quantities that the liquid in the anode compartment is always at level B. The gaseous chlorine present in the space above the anolyte maintains the pressure in this space and, hence, the upper end of the tube 35A at a somewhat elevated pressure, and consequently the incoming brine in the inlet tube 35 is at a level E higher than the anolyte level B. The elevated pressure also causes the liquid level F in the anode compartment section of the transfer passage 38 to be below the levels C and D in the cathode compartment. Because the tube 35A surrounding the inlet tube 35 extends down to near the bottom of the anode compartment, it is ensured that the brine introduced into the anode compartment is thoroughly mixed with the anolyte instead of more or less directly passing into the transfer passage 38. At the same time, the chlorine gas bubbles formed at the anode and rising in the anolyte are effectively prevented from entering the inlet tube 35.

Because the brine inlet tube 35 opens below the anolyte level B, the incoming brine forms a liquid seal which effectively prevents the gaseous chlorine collected at the top of the anode compartment from escaping through the inlet tube. Thus, as long as the anode compartment is filled up to level A, the chlorine can only escape through the chlorine gas outlet 36.

In order that chlorine gas may not escape through the brine inlet tube 35 even if the anolyte level should fall below level A, e.g. because of inadequate supply of fresh brine, a liquid seal plug 35B (omitted from FIG. 1 but shown in FIG. 1A) is inserted in the lower end of the brine inlet tube 35. This liquid seal plug ensures that a body of liquid forming a liquid seal remains in the brine inlet tube.

The hydrogen gas evolved in the cathode compartment 31 escapes directly to the atmosphere through the outlet 41. The water supplied to the cathode compartment through the conduit 42 carries away a portion of the electric heat produced in the cathode compartment. Although the rate of flow of the liquid coolant that is thus mixed with the catholyte is relatively small, the cooling is sufficient to keep the cell temperature at a suitable level. A contributory factor is that the cell operates at high electrical efficiency so that sufficient chlorine output can be attained with low electrolyzing current density. A factor contributing to the high efficiency is the reduction of the hydroxyl ion concentration of the catholyte brought about by the water feed to the cathode compartment through the conduit 42. Another contributing factor is that despite the water feed, the conductivity of the catholyte is kept at a high level because of the transfer of anolyte to the cathode compartment through the transfer passage 38.

Because the water feed conduit 42 opens near the bottom of the cathode compartment 31, the supplied water is thoroughly mixed with the catholyte instead of passing more or less directly through the outlet 40.

At the end of the operating period, the supplying of electric energy to the electrodes 33 and 34 is discontinued, and at the same time the discontinuous water feed from the metering device 22 ceases. The discontinuance of the current causes the chlorine production to cease, and the gaseous chlorine remaining in the anode compartment and the chlorine conduit 36A rapidly dissolves in the water in the mixing valve 23. As a consequence, a partial vacuum or reduced pressure is created above the anolyte in the anode compartment, but this partial vacuum can never exceed a relatively low value determined by the distance between the levels A and B and the density of the brine (the difference in density between the fresh brine and the anolyte is disregarded here); normally, this value corresponds to one or a few centimeters of water pressure. If the pressure in the anode compartment tends to be reduced further, the liquid level E in the inlet tube 35 will tend to fall below the level A and admit atmospheric air into the anode compartment.

In order that the partial vacuum in the anode compartment may not cause water to be siphoned from the mixing valve 23 through the chlorine conduit 36A into the anode compartment and thus cause the anode compartment to become filled with pure water (because of the poor conductivity of the pure water, this would delay the restarting of the chlorine production), the chlorine conduit 36A extends sufficiently high above the water level G in the mixing valve to prevent such siphoning. Thus, the vertical distance H between the highest portion of the chlorine conduit and the water level in the mixing valve is at least equal the distance between the levels A and B multiplied by the ratio of the brine and water densities (the relatively small difference between the densities of the fresh brine entering the electrolytic cell and the anolyte is again disregarded).

The brine source 21 comprises a container 50 which is attached to a holder 51 through a readily releasable connection at the container mouth; the holder also forms a cover for the container mouth. A vertical salt charging and water inlet tube 52 extending upwardly from the container mouth opens into the uppermost portion of the container 50. A vertical riser tube 53 extends downwardly from the container neck to near the bottom of the container and at its upper end communicates through a transfer passage 54 and an overflow 55 with a discharge tube 56 opening into the inlet tube 35 of the electrolytic cell. Upstream of the overflow 55 the transfer passage 54 communicates with a water feed passage 57. Each time a new operating cycle commences, water is supplied through this feed passage in a manner described in greater detail below.

A passage 58 connects the salt charging and water feed tube 52 with an outlet of the metering device 22.

When the chlorinator is to be made ready for operation, sodium chloride in solid, crystal form is charged through the tube 52 until it reaches a predetermined level in the container 50. Water is then filled into the container, suitably to a level equal to or slightly higher than the level of the overflow 55. In the container there is thus formed brine which is saturated at the lower portion and the concentration of which gradually decreases upwardly. If the liquid level in the tube 52 is sufficiently high, the riser tube will contain saturated brine up to the overflow 55; the liquid level in the tube 52 will be slightly higher, because the density of the saturated brine in the riser tube is higher than that of the less concentrated brine in the tube 52. If additional water is fed into the tube 52, a corresponding quantity of saturated brine will therefore be forced to pass over the overflow 55 into the inlet tube 35 of the electrolytic cell.

During the operating periods the metering device 22 repeatedly supplies a predetermined quantity of water through the passage 58 to the tube 52 at predetermined intervals, for example, every one or few minutes. Each time this happens, the anode compartment 30 of the electrolytic cell receives a corresponding quantity of saturated brine. The quantity of fresh brine supplied to the anode compartment is larger than the quantity of the anolyte which is decomposed according to Faraday's law of electrolysis, and consequently some of the anolyte will flow from the anode compartment into the transfer passage 38 and displace a corresponding quantity of anolyte into the cathode compartment 31. At the same time the cathode compartment receives pure water from the metering device 22 through the conduit 42. The quantities of water which the metering device 22 supplies to the brine source 21 through the passage 58 and to the cathode compartment 31 through the conduit 42 are controlled so as to be approximately proportional to the amperage of the current flowing between the electrodes, i.e. to the electrolyzing current density.

Because the brine flowing through the transfer passage 54 over the overflow 55 is saturated, solid salt may be precipitated near the overflow, where some evaporation of the water in the brine may take place. If the precipitated salt is not removed, it may gradually build up solid deposits which interfere with the supply of fresh brine to the electrolytic cell. In order that any salt precipitates may be removed before they form hard deposits, the metering device 22 and the device 25 controlling it are arranged such that the metering device feeds, once during each operating period (i.e. normally once or a few times per day, depending on the frequency at which the operating periods occur) a predetermined quantity of pure water to the transfer passage 54 through the water feed passage 57. This water dissolves any salt precipitate and carries it away to the anode compartment 30. To this end, the metering device 22 is constructed as follows.

The metering element of the metering device 22 is a solenoid valve disposed at a lower level than the mixing valve 23 and having an inlet connected to the mixing valve 23 and two outlets, one of which is connected to the salt charging and water inlet tube 52 of the brine source through the passage 58 and the other of which is connected to a stagnation chamber 59. The stagnation chamber in turn is connected to the water feed conduit 42 of the electrolytic cell through a flow restrictor 60 and a water conduit 61, and to the water feed passage 57. The connection to the water feed passage 57 is made such that water can flow into that passage only when the stagnation chamber 59 is filled up to a predetermined level.

The restrictor 60 is sized such that the predetermined level is not reached when the solenoid valve is repetitively and regularly opened, e.g. every minute or every two minutes, during the operating periods to feed only a relatively small quantity, e.g. 4 to 5 cubic centimeters, of water to the stagnation chamber, but only at the occasion during each operating period when the solenoid valve is opened to feed an extra large quantity, e.g. 40 to 50 cubic centimeters, of water. A substantial portion of this large quantity of water flows through the water feed passage 57 into the transfer passage 54 and removes any salt residues therein, and into the discharge tube 56 opening into the inlet tube 35 of the electrolytic cell. It has been found that it is normally sufficient to supply the large quantity of water for the removal of any salt residues only once per operating period, that is once or a few times per day, but if necessary the large quantity of water may be supplied more frequently.

The solenoid valve of the metering device 22 is normally closed and is opened in response to a signal from the device 25 to pass through the two outlets a quantity of water which is proportional to the duration of the signal. The outlets are sized such that the outlet connected to the stagnation chamber 59 receives about three times the quantity of water fed to the salt charging and water feed tube 52. This ratio of about 3:1 has been found to be suitable in one specific case, but it is within the scope of the invention to vary the ratio over a wide range, from about 1:1 to about 5:1. The preferred range is about 2:1 to about 4:1. The ratio providing the best result (in respect of efficiency and cooling) is dependent on, among other things, the excess of anolyte transferred through the transfer passage 38, i.e. on the quantity of fresh brine fed into the electrolytic cell through the inlet tube 35.

The mixing valve 23, which serves to mix the chlorine produced in the electrolytic cell with a stream of water diverted from the recirculating conduit 11 and which also feeds water under constant hydrostatic pressure to the metering device 22, has a water inlet 70 connected to the intake conduit 14 of the chlorinator, a chlorine gas inlet 71 connected to the chlorine gas conduit 36A, a water outlet 72 connected to the inlet of the metering device 22, and a chlorinated-water outlet 73 connected to the suction inlet of the eductor 24.

Both the water inlet 70 and the chlorinated-water outlet 73 are controlled by a common float 74 in a vented float chamber 75 and a pivoted valve member 76 connected with the float, the control being such that the inlet 70 is opened and the outlet 73 is closed in response to lowering of the float while the inlet 70 is closed and the outlet 73 is opened in response to rising of the float. The float-controlled valve mechanism maintains the water in the float chamber at the constant level G which is above the point where the chlorine gas inlet 71 opens into the float chamber. Thus, the chlorine gas from the conduit 36A always enters the float chamber below the water level G and is immediately discharged through the chlorinated-water outlet 73 in a manner to be described.

The chlorinated-water outlet 73 is also disposed below the water level G near the chlorine gas inlet 71, and both the chlorinated-water outlet and the chlorine gas inlet are surrounded by a skirt 77 defining an upwardly closed space with which the chlorinated-water outlet communicates and into which the chlorine gas inlet opens. This arrangement ensures that the chlorine gas is immediately dissolved in and carried away with the water discharged through the chlorinated-water outlet 73 and is effectively prevented from escaping into the float chamber.

Figure 2:
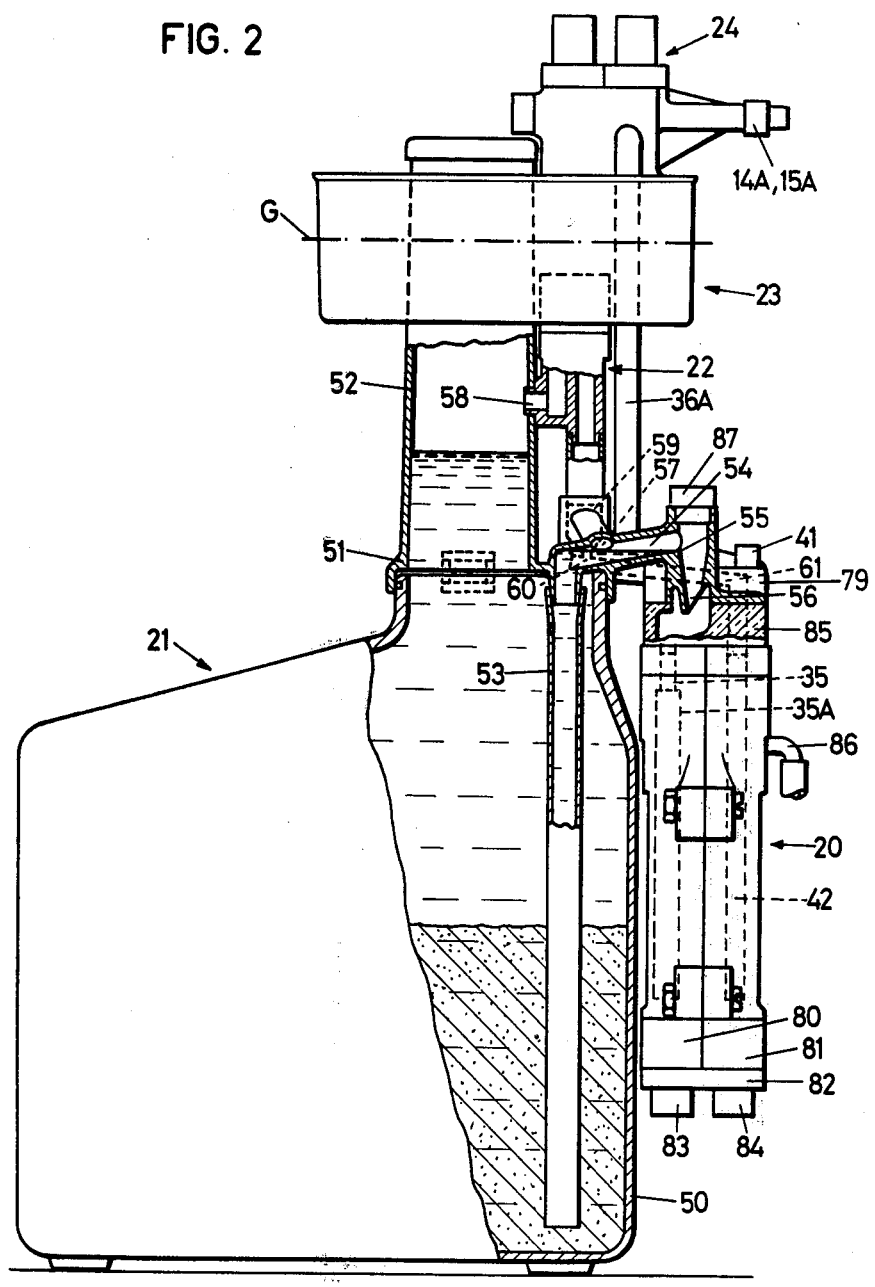
FIG. 2 is an elevational view, partly in section, of the chlorinator of FIG. 1.

The mechanical construction of the chlorinator is shown in FIG. 2 which is a detailed illustration of the above-mentioned main parts with the exception of the current supply and the control device 25. These main parts, that is, the electrolytic cell 20, the brine source 21, the metering device 22, the mixing valve 23 and the eductor 24, and certain ancillary devices not shown are structurally combined into a single unit ready for connection to the recirculating conduit 11 of the pool and to the current supply and control device 25. This unit may rest on a horizontal base or it may be secured to a bracket or other suitable support on a wall or a frame by means of the holder 51.

The holder 51 is integral with the salt charging and water feed tube 52 and with a head 79 of the electrolytic cell. This head, which forms a structural connection between the electrolytic cell 20 and the brine source 21, is internally formed with the transfer passage 54, the overflow 55, the discharge tube 56, the transfer passage 57, the stagnation chamber 59, the restriction 60 and the conduit 61 opening into the water feed conduit 42. To the head 79 is attached the chlorine gas conduit 36A which is connected to the mixing valve 23 in the abovedescribed manner, extending sufficiently high above the water level G therein to prevent siphoning from the mixing valve into the electrolytic cell.

The metering device 22, the mixing valve 23 and the eductor 24 with its connectors 14A, 15B for the intake and return conduits 14,15 shown in FIG. 1 are fixedly attached to the tube 52 and disposed at a level above the highest possible level the water in the tube 52 can reach.

The main parts of the electrolytic cell 20 are two identical housing sections, namely, an anode compartment section 80 and a cathode compartment section 81, which are bolted together in reversed positions, the membrane 32 clamped between the two housing sections, and the two electrodes 33 and 34 (the elements 32,33,34 not being shown in FIG. 2). A base 82 closes the lower ends of the anode and the cathode compartment sections 80,81 and is provided with drain plugs 83 and 84 for the anode and cathode compartments. An adapter 85 disposed between the head 79 and the upper side of the anode and cathode compartment sections 80,81 is made of transparent material to permit visual observation of the introduction of brine and water.

The side wall of the cathode compartment section 81 has a connector 86 which forms the overflow 40 of the cathode compartment and which is connected with a discharge hose (not shown) from an overflow discharge of the mixing valve 23.

The tube 35A, which surrounds the inlet tube 35, as well as the transfer passage 38 between the anode compartment 30 and the cathode compartment 31, and that portion of the water feed conduit 42 which is situated below the adapter 85 are formed by internal channels or bores in the anode compartment section 80 and cathode compartment section 81. The brine inlet tube 35 is a short vertical tube, the upper end of which is secured to the anode compartment section and the lower end of which extends downwardly into the anode compartment. A plug 87 secured to the head 79 and having a vent opening ensures that the upper end of the inlet tube 35 is always at atmospheric pressure.

The chlorinator according to the invention may be sized to meet the normal chlorine demand of most installations of the character referred to initially, and still have relatively small dimensions. If in a particular instance the chlorine demand is too great to be met by a single chlorinator of the size available, it is of course possible to use two or more chlorinators operating in parallel.

What is claimed is:

1. Device for chlorinating water, comprising
   (a) an electrolytic cell including (1) means defining an anode compartment having a brine inlet and a chlorine gas outlet and a cathode compartment having a catholyte overflow outlet vented to the atmosphere, (2) a substantially vertical membrane permeable substantially only to cations and forming a barrier between the anode and cathode compartments, and (3) means defining a liquid trap passage extending between the anode and cathode compartments and communicating with the cathode compartment at a first overflow and with the anode compartment at a second overflow defining a maximum anolyte level, the level of at least one of said overflows being sufficiently high above the level of said catholyte overflow outlet to prevent liquid in the cathode compartment from flowing through the liquid trap passage into the anode compartment,
   (b) a brine source having a chloride container for accommodating a charge of an electrolyzable chloride compound in solid form, means for controlling a supply of water to the chloride container for forming brine therein, and brine feed means for feeding brine to the brine inlet of the electrolytic cell, and
   (c) a chlorine-water mixer having a chlorine intake connected to the chlorine outlet of the electrolytic cell and an inlet and an outlet for a stream of water to be chlorinated, said chlorine intake communicating with said outlet.

2. Device according to claim 1 including means for controlling a supply of water to the cathode compartment of the electrolytic cell in a predetermined volumetric ratio to the quantity of water supplied to the chloride container, said ratio being between 1:1 and 5:1.

3. Device according to claim 2, said means for controlling a supply of water to the chloride container and to the cathode compartment being adapted to supply the water intermittently in predetermined discrete quantities.

4. Device according to claim 1, said brine feeding means comprising a riser tube extending upwardly from near the bottom of the chloride container and means defining a brine feed passage extending from the upper end of the riser tube to the brine inlet of the electrolytic cell and including a third overflow at a level higher than the levels of said first and second overflows, and said means for controlling the supply of water to the chloride container including a source of water and a metering device for supplying at regular intervals a predetermined first volume of water from the source of water to the chloride container under the action of a constant hydrostatic pressure head and for supplying at substantially longer intervals a substantially larger second volume of water to the brine feed passsage upstream of said third overflow.

5. Device according to claim 4 including means defining a stagnation chamber having an inlet connected to an outlet of the metering device to receive said first and second volumes of water, a first outlet, a fluid conduit including a flow restrictor and connecting the first outlet with the cathode compartment, and an overflow outlet communicating with the brine feed passage, the stagnation chamber and the restriction being sized such that the level of the overflow outlet is reached in the stagnation chamber only at a time that the second volume of water is supplied.

6. Device according to claim 1, the brine inlet of the electrolytic cell being vented to the atmosphere and including a tubular member extending downwardly into the anode compartment and opening therein on a level (A) lower than the level (B) of said second overflow, the chlorine-water mixer including a vented water reservoir and means for maintaining a constant water level (G) in the water reservoir, the outlet for the stream of water to be chlorinated and the chlorine intake opening into the water reservoir below said water level (G), and the connection of the chlorine intake and the chlorine outlet of the anode compartment being effected by means of a chlorine conduit extending up to a level sufficiently high (H) above said water level to preclude siphoning of water from the water reservoir into the electrolytic cell by a stub-atmospheric pressure in the anode compartment as long as the difference between said sub-atmospheric pressure and the atmospheric pressure is smaller than the hydrostatic pressure head produced by the anolyte column between said opening level (A) of said tubular member and the level (B) of said second overflow.

7. Device according to claim 6 including means defining a vertical brine passage communicating with the chlorine outlet of the anode compartment on a level above the level (B) of said second overflow and extending downwardly at least to a level near the level of the lowermost portions of the elements at which chlorine is evolved in the anode compartment.

8. Device according to claim 6, the water reservoir including means defining a mixing chamber substantially in the shape of an inverted cup, the chlorine intake and the outlet for the stream of water to be chlorinated opening into the interior of said mixing chamber above the lower edge thereof.

9. Device according to claim 1, the level of the first overflow being higher than that of the catholyte overflow and the level of the second overflow being higher than that of the first overflow.

10. A device according to claim 1 in which said supply of water is obtained from said chlorine-water mixer upstream of the place where the mixing takes place.

* * * * *